United States Patent Office 3,501,389
Patented Mar. 17, 1970

3,501,389
IRRADIATED OLEFIN OXIDE POLYMERS
William W. Spooncer, Richmond, and Ronald S. Bauer, San Pablo, Calif., assignors to Shell Oil Company, New York, N.Y., a corporation of Delaware
No Drawing. Filed Mar. 29, 1963, Ser. No. 269,128
Int. Cl. C08f 1/16; B01j 1/10
U.S. Cl. 204—159.22          1 Claim

ABSTRACT OF THE DISCLOSURE

Olefin epoxide monomers are polymerized by exposure to high energy ionizing radiation to yield linear thermoplastic polymers. A novel copolymer of isobutylene oxide and bicyclo-[2.2.1]-2,5-heptadiene is produced.

---

This invention relates to the polymerization of epoxide monomers. More particularly, the invention relates to a novel process for polymerizing olefin epoxides.

Specifically, the invention provides novel linear thermoplastic polymers of olefin epoxides prepared by a process which comprises exposing the epoxide monomer in the condensed phase, usually in the absence of oxygen, to high energy ionizing radiation of substantial penetrating power. The invention further provides a process for the preparation of these novel polyether polymers.

The polymerization of olefins containing an oxirane structure, such as isobutylene oxide, via conventional catalysts, such as, for example, stannic chloride, antimony trichloride, antimony pentachloride, antimony trifluoride, antimony pentafluoride, phosphorous pentafluoride, boron trifluoride, aluminum triethyl, aluminum triisobutyl, aluminum diethyl chloride, aluminum diethyl fluoride, aluminum ethyl dichloride, aluminum diethyl ethoxide and the like, yields relatively low molecular weights, below 10,000. Thus, for example, polymers prepared in this manner using BF$_3$-etherate were of rather low molecular weight, that is ca. 3,000 to 6,000. This was true regardless of the catalyst concentration, solvent or temperature of the polymerization. For a large number of applications a higher molecular weight is not only desirable, but oftentimes necessary.

It has now been found that polymers prepared by radiation-induced polymerization of olefinic epoxides have unexpectedly high molecular weights, that is, over twice as high as obtainable from the conventional methods disclosed above. These polymers prepared by radiation-induced polymerization are insoluble or slightly soluble at low temperatures in most common organic solvents, such as aromatic and chlorinated hydrocarbon solvents such as benzene, toluene, xylene, carbon tetrachloride, acetone and the like. However, most of these polymers become somewhat more soluble at higher temperatures. In general, these polyether polymers exhibit thermoplastic properties. The present invention thus provides a thermoplastic polymer of an olefinic epoxide and its preparation by the radiation-induced polymerization of said epoxides.

The monomers which are suitable for use in the present invention include, among others, trimethylethylene oxide, tetramethylethylene oxide, vinyl cyclohexene oxide, cyclohexene oxide, styrene oxide, butadiene monoxide, epichlorohydrin, glycidaldehyde, 2,2-dichloromethylethylene epoxide, α-methylstyrene epoxide, and methylene cyclohexane epoxide, all of which contain a single vic epoxide group.

Other types of compounds which may be suitable for preparing the polymers of the present invention may be represented by the following generalized structure:

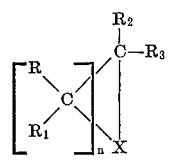

wherein X may be a —O, —S, —NR, or —PR group; R, R$_1$, R$_2$ and R$_3$ may be a hydrogen and/or an alkyl, aryl, or substituted alkyl or aryl, said substituents being for example, halogens, and $n$ is an integer having a value equal to or greater than 1. Especially preferred monomers are those wherein the R's contain up to about 6 carbon atoms. A very suitable monomer having the above general structure is thetane,

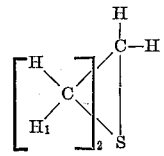

A particularly preferred monomer is isobutylene oxide because of its ease in polymerization and general availability.

The monomers used in the present process should be substantially pure. Purity of at least 95% and preferably 97% is desired.

It is especially important to avoid the presence of molecular oxygen and oxygenated compounds such as, for example, carbon dioxide, ethanol, methanol, acetone, ether, and the like.

The present invention utilizes ionizing radiation which has the power to penetrate to a substantial depth, i.e., at least about 1 cm., into a mass of monomer in condensed phase, that is, in a solid or liquid phase. This is sometimes referred to herein as radiation of substantial penetrating power. In accordance with this invention, a mass of the epoxide monomer in condensed phase is exposed to such radiation from a source which is not finely dispersed within said mass. The radiation may be introduced into the condensed mass, held in a vessel, through a suitable window in the vessel or by placing an intensive source of radiation, such as a canned mass of gamma-ray emitter, into the vessel containing the monomer. To simplify terminology, such sources which are not finely dispersed within the mass are referred to herein as "external" sources.

The kinds of radiation suitable for use in the present invention include high energy electrons, protons and photons. Electron beams are suitably produced by electron accelerators such as the Van de Graff, resonance transformers and linear accelerators or by a suitable arrangement of certain isotopes, e.g., strontium 90. High energy photons suitable for use are, for example, X-rays produced by conventional X-ray tubes and electron accelerators and gamma-rays which may be produced by decay of radioactive materials such as cobalt 60, cesium 137 and fission products. Although somewhat different effects may be observed in irradiation by heavy particles, the present invention also contemplates particularly the use of the high energy protons or neutrons. Neutrons are produced, for example, by accelerators such as Van de Graff, linear accelerators and cyclotrons. Fast neutrons may be obtained within a nuclear reactor or may be obtained as a beam out of a nuclear reactor. Fast neutrons act on hydrocarbons mainly by transferring their energy to protons which, being charged, induce ionization and excitation as they pass through the monomer mixture.

The devices suitable for producing beams of electrons, protons, X-rays and fast neutrons are well known in the art and need not be described herein in detail.

Methods and apparatus for irradiating materials by means of radiation resulting from decay of radioactive substances are also well known. Sources such as rods containing a high concentration of cobalt 60 are used in various arrangements for the irradiation of materials as described, for example, in the pertinent paper by Burton et al., Nucleonics, 13 (No. 10), 74 (1955) and references cited therein.

A preferred process comprises exposing of the monomer mixture to radiation by passing it through a nuclear reactor which may, at the same time, be employed for power producing purposes or may be utilized exclusively for polymerization. A suitable reactor is described in substantial detail in the Fermi et al. patent, U.S. 2,708,656.

The total dosage needed to effect polymerization will vary with the various monomers. Preferred total dosage varies from $10^5$ to $5 \times 10^6$ rads; dosages of up to $5 \times 10^8$ rads or more, calculated on the total mixture, may be employed if polymer is removed from the irradiation zone after it is formed. A rad is defined as 100 ergs of ionizing energy absorbed per gram of the irradiated mixture.

The dosage rate will also vary considerably. Preferred dosage rate varies from about $10^4$ to $10^{12}$ rads per hour, and still more preferably $10^5$ to $10^{10}$ rads per hour. In systems in which the radiation reaches only a portion of the total mass of monomer contained in a vessel, e.g., where an electron beam penetrates only into the upper part of a vessel, the dose rate calculated on the basis of the amount of material in the volume actually reached by the radiation is called the "instantaneous dose rate." The above numerical values are applicable.

The radiation is conducted at a temperature between about $+30°$ C. and $-180°$ C. The radiation is preferably accomplished at temperatures ranging from below $-80°$ C. to $4°$ C. These temperatures may be obtained by conventional techniques such as use of liquid nitrogen, Dry Ice, boiling ethylene and the like.

The process is conducted in an inert atmosphere, such as helium, or it may be accomplished by use of high vacuum. The molecular oxygen preferably should not be more than $10^{-3}$ mol percent.

When carrying out the process of the invention by means of radiation with a beam of particles, the radiation mixture is preferably contained in a cell constructed of a suitable material and having a window transparent to the beam. The reaction mixture may be irradiated statically or the mixture may be passed through a conduit having a window transparent to the beam so that it is irradiated in a flow system. In either case, provision should be made to remove a small amount of gas, generally mainly hydrogen, which may be formed during the radiation. Table I illustrates suitable windows and cell construction materials to be used with various types of radiation. The whole cell or conduit within the field of radiation may be made of the transparent material.

TABLE I

| Radiation | Cell material | Window |
|---|---|---|
| X or gamma | ¼″ Al, 1/0″ S.S. (or any other materials). | None needed. |
| Fast neutrons | Aluminum (or metals of low capture cross section). | Do. |
| Electrons | Any | Thin aluminum foil, thin S.S. foil or other thin metals. |

One of the preferred means of exposure, due particularly to the relatively low cost of the treatment, comprises placing of suitably canned spent nuclear fuel elements (removed from nuclear reactors) in a tank containing the monomers. An ordinary storage tank, properly shielded may be used, and the mixture of monomers should be circulated so as to effect uniform exposure to the spent fuel elements.

In effecting radiation, the feed mixture may be introduced into the interior of a reactor, as, for example, in a well designed reactor for that purpose or through a cooling tube or tubes.

The mixtures to be treated may be introduced into the reactor or into the path of the fast neutron or high energy beam in a receptacle in the reactor or in the path of the beam and subjected to irradiation while they are substantially static.

The process of the invention may be used to copolymerize the epoxides with one or more ethylenically unsaturated monomers, i.e., monomers containing a $>C=<$ group and preferably a $CH_2=C<$ group. These monomers may possess one or more ethylenic groups and may be aliphatic, cycloaliphatic, aromatic or heterocyclic in structure. Particularly preferred monomers are those which can be polymerized by ionic polymerization, e.g., those that can be polymerized to greater than dimers by treatment with $AlCl_3$ at low temperature, e.g., $-10°$ C. to $-90°$ C. Examples of such monomers include, among others, isobutylene isoamylene, styrene, vinyl acetate, alpha-methylstyrene, dichlorostyrene, methoxystyrne, isoprene, butadiene, methyl pentadiene, methyl methacrylate, vinyl chloride, methacrylonitrile, vinyl alkyl ethers, as vinyl butyl ether, vinyl ketones, as vinyl butyl ketones, ethyl acrylate, allyl acetate, acrylonitrile and the like. Especially preferred monomers include the alpha-olefins and polyolefins containing up to 8 carbon atoms, the alkyl, chloro- and alkoxy-substituted styrenes and the acrylate esters.

Other co-monomers may include the cycloalkenes such as cyclopentadiene, bicycloheptadiene, bicyclopentadiene and bicycloheptene, as well as such oxygen bases as other epoxides, trioxane, oxetanes, lactones and aldehydes.

Preferable copolymers are those containing from about 10% to 99% by weight of the olefin epoxide and the remainder being one or more of the above-described copolymerizable ethylenically unsaturated monomers.

The polymers obtained from the radiation-induced polymerization are linear polyethers which are not cross-linked and have essentially the same unitary chemical structure as the polymers prepared from the conventional chemical catalysts, such as aluminum triethyl, as determined by infrared spectra, but are of much higher molecular weight than hitherto attainable. They are somewhat insoluble in all common solvents at room temperature. At higher temperatures most of these polyethers exhibit an increase in solubility. As noted, these radiation-induced polymers have an unexpectedly higher molecular weight, that is, molecular weights in excess of twice those previously obtainable have been achieved. Thus, the molecular weights of the present polyethers are greater than about 10,000. Preferred molecular weights are greater than about 15,000 with molecular weights above 50,000 being especially preferred.

Because of their high molecular weight and linear structure, the new polyethers are useful materials for production of plastic articles of manufacture such as compression and injection molded objects, blown film, slot cast film, laminates with other resinous or thermoplastic polymers, fibers and the like. For these and related uses, various additives may be incorporated with the new polyethers including fillers, pigments, dyes, plasticizers, etc.

The following examples illustrate the present invention. It is to be understood that the examples are for the purpose of illustration and the invention is not to be regarded as limited to any of the specific compounds or conditions recited therein. Unless otherwise specified, parts and percentages disclosed in the examples are by weight.

EXAMPLE I

This example illustrates the radiation-induced polymerization of isobutylene oxide and the resulting polymer properties.

Isobutylene oxide was first prepared by slowly adding 1-chloro-2-methyl-2-propanol (obtained from the hydration of methallyl chloride with sulfuric acid) to potassium hydroxide pellets at such a rate that the temperature of the resulting distillate did not exceed 55° C. The resulting material was dried with calcium sulfate, heated under reflux overnight with potassium hydroxide, and fractionally distilled onto calcium hydride. Finally, the product was heated under reflux for 24 hours over calcium hydride and then fractionally distilled again; boiling point 50.5° C. (uncorrected).

Approximately 8 parts by volume of this previously prepared isobutylene oxide was transferred to a receiver on a vacuum line containing barium oxide. After the monomer had been in contact with the barium oxide for approximately 15 minutes it was transferred under vacuum to a weighed irradiation ampoule. The sample was then degassed at low pressure using three freeze-thaw cycles, the tubes were sealed with a torch, and the weight of the sample determined.

Since it was found that the polymerization was quite sensitive to differences in the condition of the surface of the glass-irradiation ampoules, the ampoules were cleaned by a standard technique. All ampoules were filled with chromic acid cleaning solution, cleaned by heating them on a steam bath for about 4 hours, washed several times in sequence with distilled water. The ampoules were stored at 110° C. at least 24 hours before filling.

A sealed ampoule containing 6.23 parts by weight of isobutylene oxide was irradiated at $-4°$ C. while rotating in a vertical beam of X-rays generated from a 3 mev. Van de Graff generator, beneath a slanted target. Temperature control was effected by immersing the ampoules in Dewar flasks containing circulating thermostatically controlled isopropanol. The total dose was $1.71 \times 10^6$ rads at a dose rate of $1.71 \times 10^7$ rads/hr. The volatile materials were removed under reduced pressure and the polymer (2.65 parts by weight, 41.7% conversion, G 3031) dried under high vacuum at room temperature overnight. The resulting crystalline polyether had a melting point of about 150° C. and had an I.V. in diphenyl ether at 150° C. of 0.049 dl./g., which approximately corresponds to a molecular weight (weight average) of over 10,000 as determined by light scattering techniques.

A film prepared by heating and pressing this polyether was clear and flexible.

EXAMPLE II

The procedure of Example I was substantially repeated wherein the polymerization was conducted at various temperatures. The radiation employed was X-rays with a dosage of $1.7 \times 10^6$ rads at a dose rate of $1.7 \times 10^7$ rads/hour. The results of the various runs are tabulated as follows:

| Temperature, ° C. | G. value [1] | Intrinsic viscosity [2] |
|---|---|---|
| Room temp | 3,070 | 0.028 |
| 3-6 | 3,300 | 0.032 |
| -4 | 3,031 | 0.049 |
| -20 | 2,620 | 0.039 |
| -40 | 1,470 | 0.057 |
| -50 | 1,470 | 0.062 |
| -78 | 223 | 0.138 |
| -190 | Very low | |

[1] A value for monomer disappearance. A G. value represents the number of molecules of monomer converted to polymer per 100 ev. of ionizing radiation absorbed.
[2] At 150° C. in diphenyl ether.

EXAMPLE III

This example illustrates that somewhat higher molecular weights are obtained when isobutylene oxide is irradiated with X-rays in the presence of an inhibitor (1.0% 2,5-dimethyl benzoquinone). This increase in molecular weight can be seen from the following tabulation:

| Temp., ° C. | G. value for uninhibited oxide | I.V. of polymer [1] | G. value for inhibited oxide | I.V. of polymer |
|---|---|---|---|---|
| -4 | 3,031 | 0.049 | 2,035 | 0.16 |
| -20 | 2,620 | 0.039 | 796 | 0.067 |
| -50 | 1,470 | 0.057 | 503 | 0.10 |

[1] In diphenyl ether at 150° C.

EXAMPLE IV

The procedure of Example I was essentially duplicated except that the isobutylene oxide was replaced with each of the following: trimethylethylene oxide, tetramethylethylene oxide, butadiene monoxide, methylenecyclohexane oxide, cyclohexene oxide and styrene oxide. Related results are generally obtained in each instance with butadiene monoxide and cyclohexene oxide producing preferred polymers.

The butadiene monoxide was irradiated with X-rays with dosages ranging from $5 \times 10^6$ to $1 \times 10^7$ rads and temperatures ranging from 25° C. to $-80°$ C. Moderate G. values were observed, that is, up to about 135. An unsaturated polyether was obtained.

Cyclohexene oxide monomer was similarly irradiated with an average dosage of $8 \times 10^6$ rads. Moderate G. values (up to 153) were also observed and the polyether had a molecular weight of about 21,000 and a melting point range of 90–100° C.

EXAMPLE V

This example illustrates the radiation-induced polymerization of thetane. Essentially the same procedure was used as in Example I except that the monomer was thetane. The resulting polymer was precipitated with methanol.

EXAMPLE VI

This example illustrates the copolymerization via X-ray radiation of isobutylene oxide and bicyclo-[2.2.1]-2,5-heptadiene. Mixtures consisting of approximately 7.3 parts of bicycloheptadiene and 2.5 parts of isobutylene were irradiated similarly to a total dose of $10^7$ rads at temperatures ranging from $-40°$ C. to $-80°$ C. The copolymer (0.12 part to 0.23 part), isolated by standard techniques, consisted of polyether and polycycloheptadiene functions.

We claim as our invention:

1. A linear thermoplastic copolymer of isobutylene oxide and bicyclo-[2.2.1]-2,5-heptadiene having a molecular weight above 10,000 as determined by light scattering techniques, said copolymer being prepared by exposing the monomers to from about $10^4$ to $10^8$ rads of high energy ionizing radiation and consisting of polyether and polycycloheptadiene functions.

(References on following page)

References Cited

UNITED STATES PATENTS

| | | |
|---|---|---|
| 3,004,961 | 10/1961 | Hauptschein. |
| 3,135,705 | 6/1964 | Vandenberg. |
| 3,135,706 | 6/1964 | Vandenberg. |

FOREIGN PATENTS 1,258,138  2/1961  France.

OTHER REFERENCES

Okamura et al., Radiation and Chemistry, vol. 3, No. 3, 1960 (pages 242–243).

Okamura et al., J.P.S. vol. 58, pages 225–953 (1962).—The above reference has been cited to include the Okamura et al. reference Isotopes and Radiation, 4,73/1961 cited on the bibliography page as reference 19.

Martin, Use of Radiation to Promote Chemical Reactions, Chem. & Eng. News, vol. 33, No. 14, Apr. 4, 1955, pp. 1424–1428.

MURRAY TILLMAN, Primary Examiner

R. B. TURER, Assistant Examiner

U.S. Cl. X.R.

204—159.11; 260—2, 20, 88.3, 94.7